US012618689B2

(12) United States Patent
Tanaka

(10) Patent No.: US 12,618,689 B2
(45) Date of Patent: May 5, 2026

(54) DEVICE, METHOD, AND COMPUTER PROGRAM FOR MANAGING MAP INFORMATION, AND MAP SERVER

(71) Applicant: Woven by Toyota, Inc., Tokyo (JP)

(72) Inventor: Masahiro Tanaka, Tokyo-to (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 204 days.

(21) Appl. No.: 18/342,958

(22) Filed: Jun. 28, 2023

(65) Prior Publication Data

US 2024/0035850 A1    Feb. 1, 2024

(30) Foreign Application Priority Data

Jul. 26, 2022    (JP) ................................. 2022-118639

(51) Int. Cl.
*G01C 21/00*        (2006.01)
*G01C 21/34*        (2006.01)
(52) U.S. Cl.
CPC ..... G01C 21/3889 (2020.08); G01C 21/3453 (2013.01)
(58) Field of Classification Search
CPC ............ G01C 21/3889; G01C 21/3896; G01C 21/3453
See application file for complete search history.

(56) References Cited

U.S. PATENT DOCUMENTS

| | | | | |
|---|---|---|---|---|
| 2019/0329791 A1* | 10/2019 | Oba | ...................... | B60W 50/14 |
| 2020/0256685 A1 | 8/2020 | Kamphenkel et al. | | |
| 2021/0333125 A1* | 10/2021 | Igarashi | .............. | G01C 21/387 |
| 2021/0341940 A1* | 11/2021 | Baik | ................. | G01C 21/3896 |
| 2022/0032955 A1 | 2/2022 | Xiang et al. | | |

FOREIGN PATENT DOCUMENTS

| | | |
|---|---|---|
| JP | 2002-005670 A | 1/2002 |
| JP | 2003-232644 A | 8/2003 |
| JP | 2020-030188 A | 2/2020 |
| JP | 2020-118890 A | 8/2020 |
| JP | 2020-537150 A | 12/2020 |
| JP | 2022-24741 A | 2/2022 |

OTHER PUBLICATIONS

Image of SAE Updated Levels of Automation, posted to https://www.sae.org/blog/sae-j3016-update May 3, 2021 (Year: 2021).*

* cited by examiner

*Primary Examiner* — Navid Z. Mehdizadeh
*Assistant Examiner* — Jared C Bean
(74) *Attorney, Agent, or Firm* — Sughrue Mion, PLLC

(57)        ABSTRACT
A map information managing device to be mounted on a vehicle includes a processor configured to set an area represented in map information including information used for autonomous driving control, depending on the level of autonomous driving control applied to the vehicle and the position of the vehicle, and request a map server to deliver the map information of the set area, via a communication terminal mounted on the vehicle.

9 Claims, 9 Drawing Sheets

FIG. 1
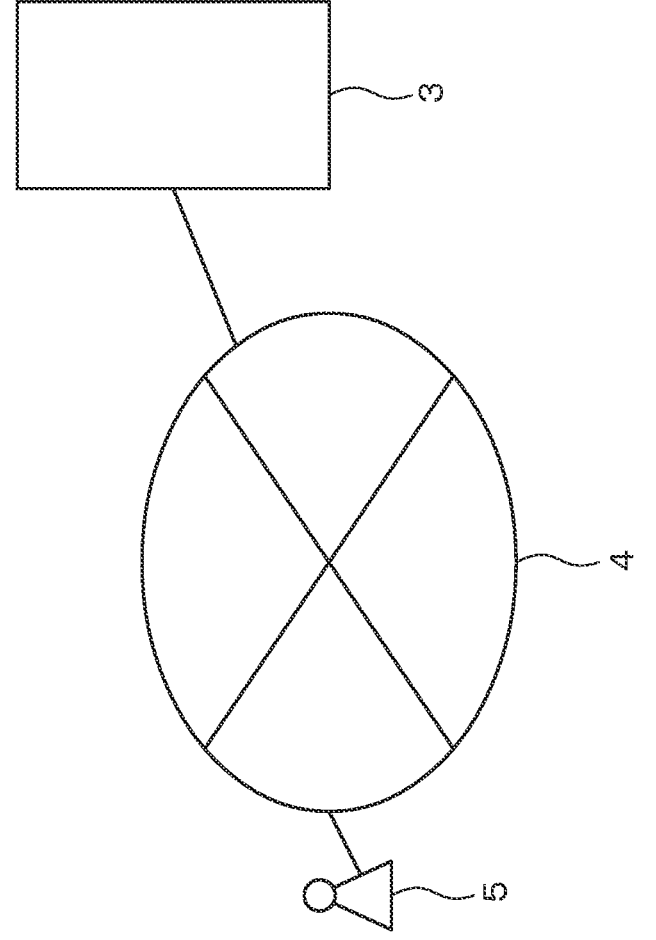
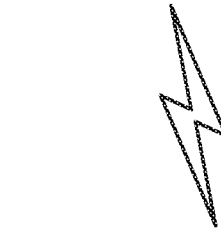

F I G. 4
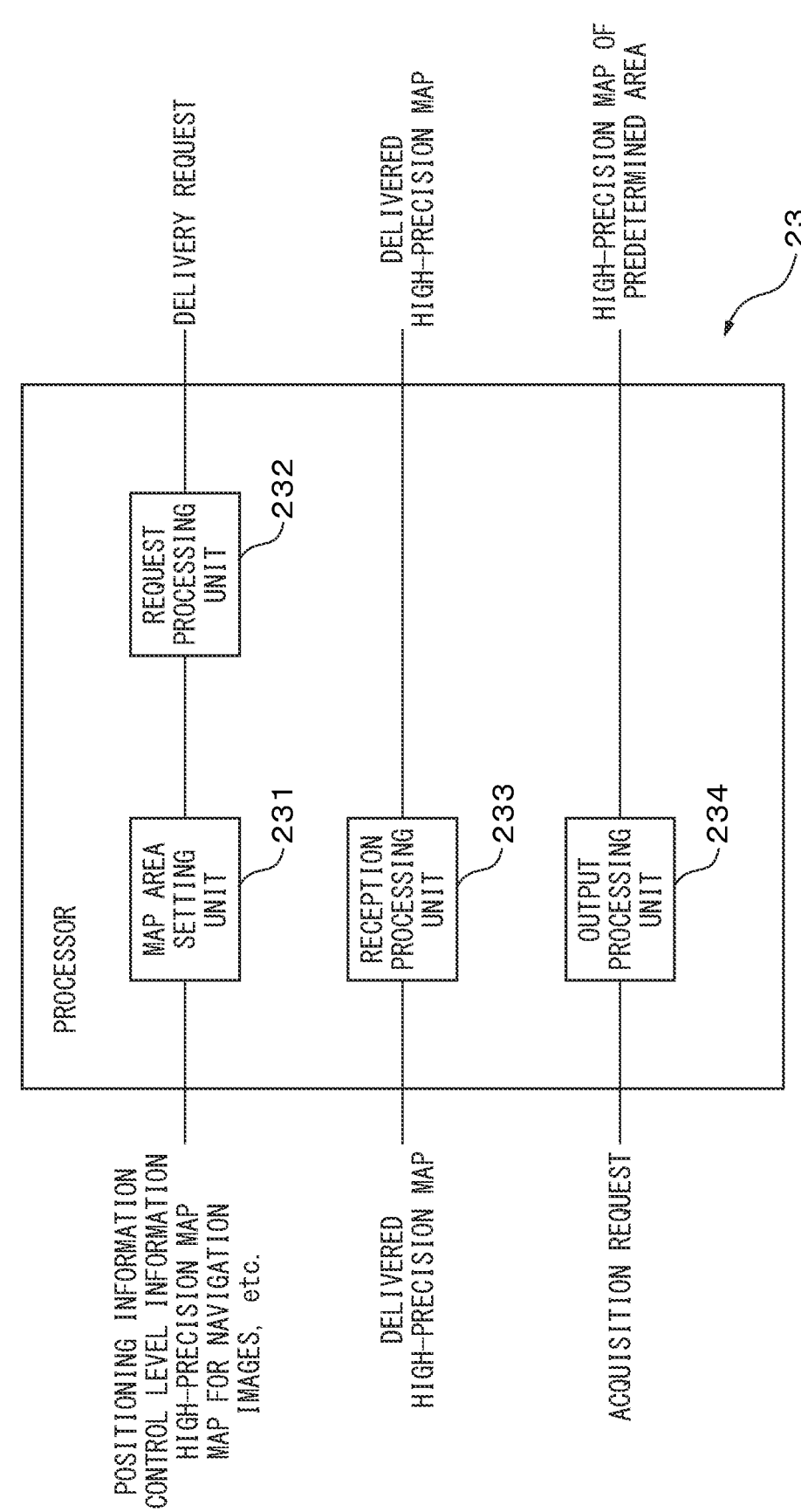

FIG. 6

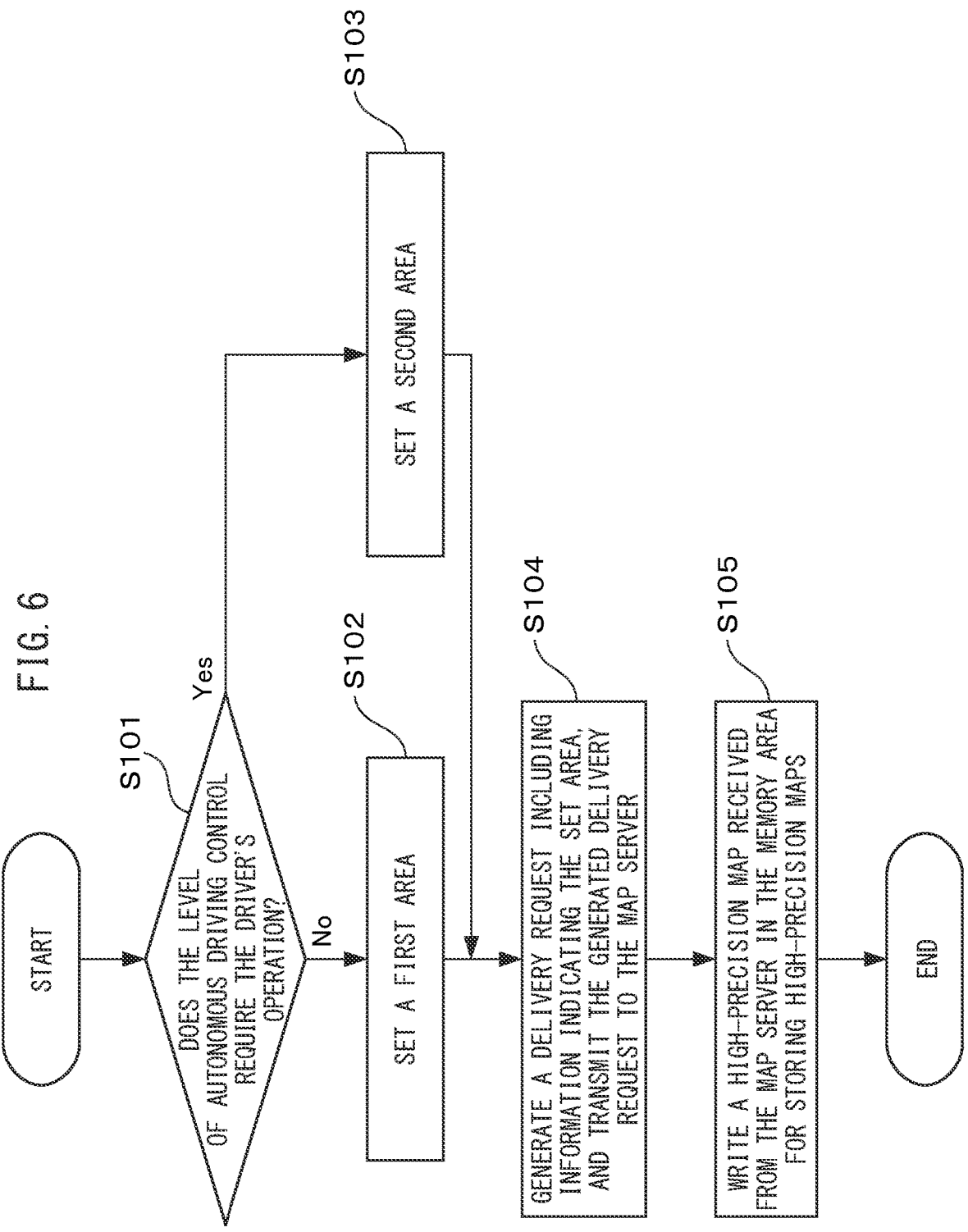

START

S101

DOES THE LEVEL
OF AUTONOMOUS DRIVING CONTROL
REQUIRE THE DRIVER'S
OPERATION?

Yes

No

S102

SET A FIRST AREA

S103

SET A SECOND AREA

S104

GENERATE A DELIVERY REQUEST INCLUDING
INFORMATION INDICATING THE SET AREA,
AND TRANSMIT THE GENERATED DELIVERY
REQUEST TO THE MAP SERVER

S105

WRITE A HIGH-PRECISION MAP RECEIVED
FROM THE MAP SERVER IN THE MEMORY AREA
FOR STORING HIGH-PRECISION MAPS

END

DEVICE, METHOD, AND COMPUTER PROGRAM FOR MANAGING MAP INFORMATION, AND MAP SERVER

FIELD

The present invention relates to a map information managing device to be mounted on a vehicle, a method and a computer program for managing map information, and a map server that delivers map information to a vehicle.

BACKGROUND

A technique for a vehicle to download map information from a server has been proposed (see Japanese Unexamined Patent Publication JP2003-232644A).

In a method of download disclosed in JP2003-232644A, map data transmitted from a download center is downloaded. The map data is selected by the download center, depending on the state of travel of an automobile indicated by, for example, a road being traveled by the automobile or an average travel speed of the automobile.

SUMMARY

As the area represented by map information transmitted from a server to a vehicle is larger, the amount of data of the map information and the communication load between the server and the vehicle increase. On the other hand, if the area represented by map information transmitted from a server to a vehicle is too limited, the vehicle may go out of the area represented by the map information in a short time, which requires the vehicle to receive map information from the server again.

It is an object of the present invention to provide a map information managing device that can appropriately set the area represented in map information received from a map server.

According to an embodiment, a map information managing device to be mounted on a vehicle is provided. The map information managing device includes a processor configured to: set an area represented in map information to be obtained from a map server including information used for autonomous driving control, depending on the level of autonomous driving control applied to the vehicle and the position of the vehicle, and request the map server to deliver the map information of the set area, via a communication terminal mounted on the vehicle.

When the level of autonomous driving control applied to the vehicle does not require a driver to operate the vehicle, the processor of the map information managing device preferably sets a first area. When the level of autonomous driving control applied to the vehicle requires a driver to operate the vehicle, the processor preferably sets a second area larger than the first area.

In this case, the processor preferably sets a predetermined section ahead of the vehicle in a road being traveled by the vehicle or in a planned travel route leading to a destination of the vehicle as the first area, and sets a predetermined-shaped region including the first area as the second area.

Alternatively, the processor preferably sets the second area so as to include one or more locations reachable by traveling a predetermined distance from the current position of the vehicle.

Alternatively, the processor preferably sets the second area so as to exclude a road leading to a trajectory along which the vehicle has traveled from the second area.

In addition, the processor of the map information managing device preferably sets a first area in the case where a driver is not required to operate the vehicle and control of the vehicle may be transferred to the driver at the level of autonomous driving control applied to the vehicle and where a road being traveled by the vehicle is an expressway. The processor preferably sets a second area larger than the first area in the case where a driver is not required to operate the vehicle and control of the vehicle may be transferred to the driver at the level of autonomous driving control applied to the vehicle and where a road being traveled by the vehicle is an ordinary road.

According to another embodiment, a method for managing map information executed in a vehicle is provided. The method includes setting an area represented in map information to be obtained from a map server including information used for autonomous driving control, depending on the level of autonomous driving control applied to the vehicle and the position of the vehicle; and requesting the map server to deliver the map information of the set area, via a communication terminal mounted on the vehicle.

According to still another embodiment, a non-transitory recording medium that stores a computer program for managing map information is provided. The computer program includes instructions causing a processor mounted on a vehicle to execute a process including setting an area represented in map information to be obtained from a map server including information used for autonomous driving control, depending on the level of autonomous driving control applied to the vehicle and the position of the vehicle; and requesting the map server to deliver the map information of the set area, via a communication terminal mounted on the vehicle.

According to yet another embodiment, a map server that delivers map information including information used for autonomous driving control is provided. The map server includes a processor configured to set an area represented in map information to be delivered to a vehicle, depending on the level of autonomous driving control applied to the vehicle and the position of the vehicle that are received from the vehicle via a communication interface, and deliver the map information of the set area to the vehicle via the communication interface.

The map information managing device according to the present disclosure has an advantageous effect of being able to appropriately set the area represented in map information received from a map server.

BRIEF DESCRIPTION OF DRAWINGS

FIG. 1 schematically illustrates the configuration of a map delivery system equipped with a map information managing device and a map server.

FIG. 4 is a functional block diagram of a processor of the map information managing device, related to a map information managing process.

FIG. 6 is an operation flowchart of the map information managing process.

DESCRIPTION OF EMBODIMENTS

Figure 2:
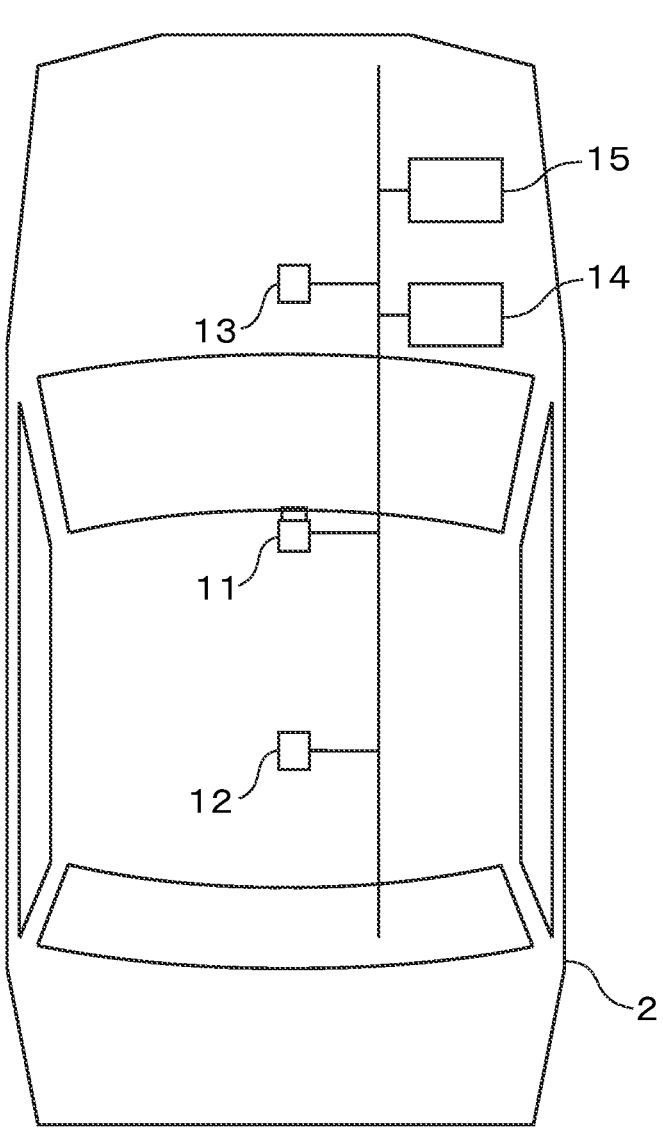
FIG. 2 schematically illustrates the configuration of a vehicle.

A map information managing device, a map server, a method for managing map information executed by the device, and a computer program for managing map information will now be described with reference to the attached drawings. The map information managing device, which is mounted on a vehicle to which autonomous driving control is applicable, requests a map server to deliver a high-precision map and manages high-precision maps received from the map server. To achieve this, the map information managing device sets an area represented in a high-precision map to be obtained from the map server, depending on the level of autonomous driving control applied to the vehicle and the position of the vehicle, and requests the map server to deliver a high-precision map of the set area, via a communication terminal mounted on the vehicle.

The high-precision map is an example of the map information including information used for autonomous driving control of a vehicle. As the information used for autonomous driving control of a vehicle, the high-precision map includes information on road markings such as lane-dividing lines and stop lines, traffic signs, and features representing road edges such as curbstones provided in individual road sections included in the area represented in the high-precision map.

FIG. 1 schematically illustrates the configuration of a map delivery system equipped with a map information managing device and a map server. In the present embodiment, the map delivery system 1 includes at least one vehicle 2 and a map server 3. Each vehicle 2 accesses a wireless base station 5, which is connected, for example, via a gateway (not illustrated) to a communication network 4 connected with the map server 3, thereby connecting to the map server 3 via the wireless base station 5 and the communication network 4. For simplicity, FIG. 1 illustrates only a single vehicle 2, but the map delivery system 1 may include multiple vehicles 2. FIG. 1 also illustrates only a single wireless base station 5, but the communication network 4 may be connected with multiple wireless base stations 5.

FIG. 2 schematically illustrates the configuration of the vehicle 2. The vehicle 2 includes a camera 11, a GPS receiver 12, a wireless communication terminal 13, a map information managing device 14, and an electronic control unit (ECU) 15, which are communicably connected to each other via an in-vehicle network conforming to a standard such as a controller area network. The vehicle 2 may further include a navigation device (not illustrated) that searches for a planned travel route of the vehicle 2 and that navigates so that the vehicle 2 travels along the planned travel route.

The camera 11, which is an example of an image capturing unit for taking pictures of the surroundings of the vehicle 2, includes a two-dimensional detector constructed from an array of optoelectronic transducers, such as CCD or C-MOS, having sensitivity to visible light and a focusing optical system that forms an image of a target region on the two-dimensional detector. The camera 11 is mounted, for example, in the interior of the vehicle 2 so as to be oriented, for example, to the front of the vehicle 2. The camera 11 takes pictures of a region in front of the vehicle 2 every predetermined capturing period, and generates images representing the region. Each image obtained by the camera 11 may be a color or grayscale image. The vehicle 2 may include multiple cameras taking pictures in different orientations or having different focal lengths.

Every time an image is generated, the camera 11 outputs the generated image to the ECU 15 via the in-vehicle network.

The GPS receiver 12, which is an example of a position determining device, receives GPS signals from GPS satellites at predetermined intervals, and determines the position of the vehicle 2, based on the received GPS signals. The GPS receiver 12 outputs positioning information indicating the result of determination of the position of the vehicle 2 based on the GPS signals to the map information managing device 14 and the ECU 15 via the in-vehicle network at predetermined intervals. Instead of the GPS receiver 12, the vehicle 2 may include a receiver conforming to a satellite positioning system. In this case, the receiver determines the position of the vehicle 2.

The wireless communication terminal 13, which is an example of the communication terminal, is a device to execute a wireless communication process conforming to a predetermined standard of wireless communication, and, for example, accesses the wireless base station 5 to connect to the map server 3 via the wireless base station 5 and the communication network 4. The wireless communication terminal 13 generates an uplink radio signal including a delivery request received from the map information managing device 14, and transmits the uplink radio signal to the wireless base station 5 to transmit the delivery request to the map server 3. Further, the wireless communication terminal 13 receives a downlink radio signal from the wireless base station 5, and passes a high-precision map included in the radio signal, which is delivered from the map server 3, to the map information managing device 14.

Figure 3:
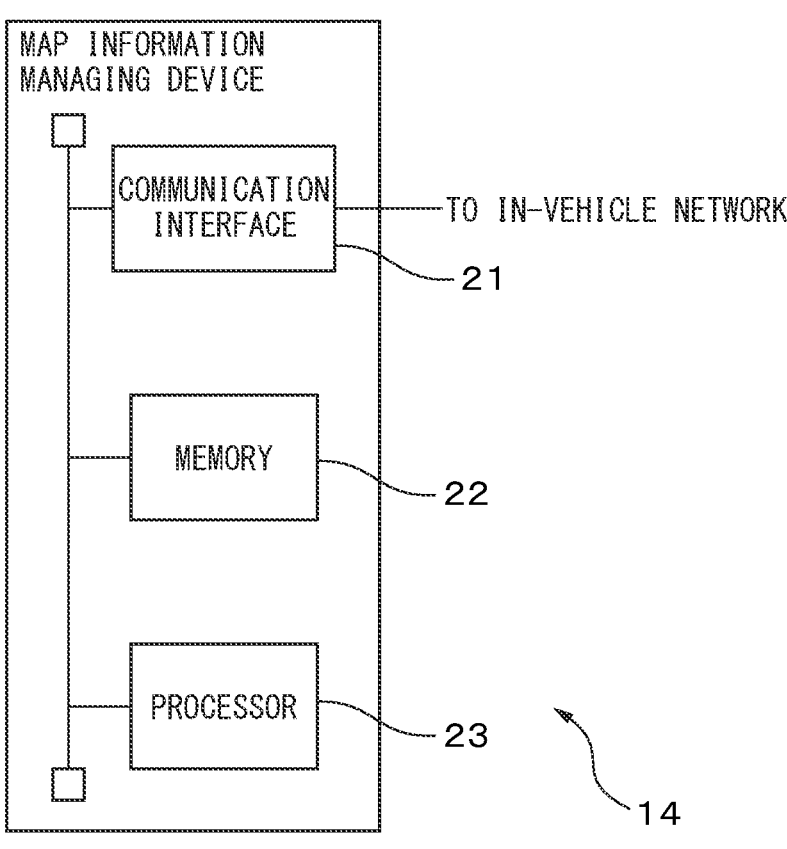
FIG. 3 illustrates the hardware configuration of the map information managing device.

FIG. 3 illustrates the hardware configuration of the map information managing device 14. The map information managing device 14 requests the map server 3 to deliver a high-precision map as necessary, stores high-precision maps delivered from the map server 3, and further outputs a high-precision map to the ECU 15 in response to a request from the ECU 15. To achieve this, the map information managing device 14 includes a communication interface 21, a memory 22, and a processor 23.

The communication interface 21, which is an example of an in-vehicle communication unit, includes an interface circuit for connecting the map information managing device 14 to the in-vehicle network. In other words, the communication interface 21 is connected to the camera 11, the GPS receiver 12, the wireless communication terminal 13, and the ECU 15 via the in-vehicle network. The communication interface 21 outputs a delivery request received from the processor 23 to the wireless communication terminal 13 via the in-vehicle network. The communication interface 21 passes images received from the camera 11 and positioning information received from the GPS receiver 12 to the processor 23. In addition, the communication interface 21 passes a high-precision map received from the map server 3 via the wireless communication terminal 13 to the processor 23. Further, the communication interface 21 passes control level information indicating the level of autonomous driving control applied to the vehicle 2, route information indicating a planned travel route of the vehicle 2, or a request for acquisition of a high-precision map, which are received from the ECU 15, to the processor 23. Further, the communication interface 21 outputs a high-precision map read from the memory 22 to the ECU 15 via the in-vehicle network.

The memory 22 includes, for example, volatile and non-volatile semiconductor memories. The memory 22 may further include other storage, such as a hard disk drive. The memory 22 stores high-precision maps received from the map server 3 and various types of data used in a map information managing process executed by the processor 23 of the map information managing device 14. Such data includes, for example, positioning information and control level information. Such data may further include map information for navigation used by a navigation device for searching for a planned travel route, route information, or images received from the camera 11. The memory 22 may further store a computer program for implementing various processes executed by the processor 23.

Since there is a limit to the storage capacity of the memory 22, a memory area in which an amount of data corresponding to a region of a predetermined area represented in a high-precision map can be stored is set in the memory 22 for storing high-precision maps. Thus, once the memory area for storing high-precision maps is filled up, some of high-precision maps stored in the memory 22 are deleted in a predetermined order every time a new high-precision map is received. The predetermined order may be, for example, the order of reception from the map server 3 or the order conforming to the least recently used (LRU) rule, i.e., the chronological order of timing of output to the ECU 15.

The processor 23 includes one or more central processing units (CPUs) and a peripheral circuit thereof. The processor 23 may further include another operating circuit, such as a logic-arithmetic unit or an arithmetic unit. The processor 23 executes a map information managing process during travel of the vehicle 2. Further, the processor 23 stores, for example, images received from the camera 11 via the communication interface 21, positioning information received from the GPS receiver 12, control level information and route information received from the ECU 15, in the memory 22.

FIG. 4 is a functional block diagram of the processor 23, related to the map information managing process. The processor 23 includes a map area setting unit 231, a request processing unit 232, a reception processing unit 233, and an output processing unit 234. These units included in the processor 23 are functional modules, for example, implemented by a computer program executed by the processor 23, or may be dedicated operating circuits provided in the processor 23.

The map area setting unit 231 sets an area of a high-precision map to be obtained from the map server 3, when the distance from the current position of the vehicle 2 to an outer edge of the area represented by a high-precision map stored in the memory 22 in the travel direction of the vehicle 2 falls below a predetermined distance. Specifically, the map area setting unit 231 sets an area of a high-precision map to be obtained from the map server 3, depending on the level of autonomous driving control applied to the vehicle 2 indicated by control level information and the current position of the vehicle 2.

In the present embodiment, when the level of autonomous driving control applied to the vehicle 2 does not require the driver to operate the vehicle 2, the map area setting unit 231 sets a first area as the area of a high-precision map to be obtained from the map server 3. When the level of autonomous driving control applied to the vehicle 2 requires the driver to operate the vehicle 2, the map area setting unit 231 sets a second area larger than the first area as the area of a high-precision map to be obtained from the map server 3.

In the present embodiment, the level of autonomous driving control at which the driver is not required to operate the vehicle 2 may be a level of driving control at which the driver is not required to operate the accelerator, brake, or steering. More specifically, the level of autonomous driving control may be a level at which the driver is required to watch around the vehicle or to hold the steering wheel or a level at which the driver is not required to do so. For example, the level of autonomous driving control may be any of levels 2 to 5 of autonomous driving control defined by the Society of Automotive Engineers (SAE). The level at which the driver is required to operate the vehicle 2 may be a level of driving control at which the driver is required to operate at least one of the accelerator, brake, and steering. For example, the level of autonomous driving control may be level 0 or 1 of autonomous driving control defined by SAE.

When setting a first area as the area of a high-precision map to be obtained from the map server 3, the map area setting unit 231 includes a predetermined section ahead of the vehicle 2 in a road being traveled by the vehicle 2 or in a planned travel route leading to a destination of the vehicle 2, in the first area.

For example, when including a predetermined section in a road being traveled by the vehicle 2 in the first area, the map area setting unit 231 identifies the road being traveled by the vehicle 2 by referring to the current position of the vehicle 2 indicated by the latest positioning information and a high-precision map stored in the memory 22. More specifically, the map area setting unit 231 identifies a road section including the current position of the vehicle 2 among individual road sections represented in the high-precision map as the road being traveled by the vehicle 2.

Alternatively, the map area setting unit 231 may compare an image received from the camera 11 with a high-precision map stored in the memory 22 to identify the road being traveled by the vehicle 2. In this case, the map area setting unit 231 detects one or more predetermined features represented in an image, such as traffic signs, road markings, or curbstones, by inputting the image into a classifier that has been trained to detect such predetermined features. The map area setting unit 231 projects the detected features onto the high-precision map by referring to the mounted position, orientation, and focal length of the camera 11 on an assumption about the position and travel direction of the vehicle 2, and calculates the degree of matching between the detected features and corresponding features represented in the high-precision map. The map area setting unit 231 identifies the position and travel direction of the vehicle 2 that maximize the degree of matching, by repeating projection of the detected features and calculation of the degree of matching while variously changing the assumed position and travel direction of the vehicle 2. The map area setting unit 231 estimates the actual position and travel direction of the vehicle 2 to be the identified position and travel direction of the vehicle 2, and identifies a road represented in the high-precision map including the estimated position of the vehicle 2 as the road being traveled by the vehicle 2. As the classifier, the map area setting unit 231 can use, for example, a deep neural network having architecture of a convolutional neural network type or a self-attention network type, or a support vector machine. The classifier is trained in advance with a large number of training images representing features to be detected, in accordance with a predetermined training technique, such as backpropagation.

When the road being traveled by the vehicle 2 is an expressway, the map area setting unit 231 determines the current position of the vehicle 2 or a location that is a predetermined distance away from the current position along the travel direction of the vehicle 2 as a start point, and determines a section having a predetermined length along the travel direction of the vehicle 2 from the start point as the predetermined section. The predetermined length may be, for example, a length of several kilometers to several dozen kilometers. The start point is preferably included in the area of a high-precision map that has received by the vehicle 2. Similarly, when the road being traveled by the vehicle 2 is an ordinary national road or a local main road, a section on the road having a predetermined length along the travel direction of the vehicle 2 from a start point is determined as the predetermined section. When the road being traveled by the vehicle 2 is not an expressway, an ordinary national road, or a local main road, the straightest section or a section that has the largest lane width along the travel direction of the vehicle 2 from the current position of the vehicle 2 is determined as the predetermined section.

When including a predetermined section ahead of the vehicle 2 in a planned travel route leading to a destination of the vehicle 2 in the first area, the map area setting unit 231 identifies the predetermined section by referring to the planned travel route indicated by route information and the current position of the vehicle 2.

When the level of autonomous driving control applied to the vehicle 2 does not require the driver to operate the vehicle 2, the vehicle 2 is supposed to keep traveling along the road being traveled or the planned travel route. Thus the map area setting unit 231 can set the first area so as to include only that predetermined section ahead of the vehicle 2 in the road being traveled by the vehicle 2 or in the planned travel route leading to a destination of the vehicle 2 which is determined as described above. This reduces the area represented by a high-precision map to be received from the map server 3 next time, and thus enables the map information managing device 14 to continue autonomous driving control of the vehicle 2 and to reduce the communication load between the map server 3 and the wireless communication terminal 13.

However, setting the first area including only the predetermined section may complicate processing by the map server 3 to cut out the first area from a high-precision map. Thus the map area setting unit 231 may set a predetermined-shaped region including the predetermined section as the first area. In this case, the predetermined shape may be, for example, a rectangle, a hexagon, or a circle.

When the level of applied autonomous driving control requires the driver to operate the vehicle 2, it may be difficult to identify roads that may be traveled by the vehicle 2. Thus, when the level of applied autonomous driving control requires the driver to operate the vehicle 2, the map area setting unit 231 sets a second area that includes the first area set as described above and that is larger than the first area.

Specifically, the map area setting unit 231 sets a second area having a predetermined shape mentioned above. Alternatively, the map area setting unit 231 may set the second area so as to include one or more locations assumed to be reachable by the vehicle 2 traveling a predetermined distance from the current position of the vehicle 2, more preferably, to include all of the reachable locations. In this case, the map area setting unit 231 identifies the one or more locations assumed to be reachable by the vehicle 2 traveling a predetermined distance from the current position of the vehicle 2, by referring to the map information for navigation. For example, when the current position of the vehicle 2 is on an expressway or an elevated road or in a tunnel, the vehicle 2 may not be able to reach another road near the expressway, elevated road, or tunnel by traveling a predetermined distance. Thus the map area setting unit 231 may set the second area so as to exclude a road unreachable by the vehicle 2 traveling a predetermined distance from the second area.

The vehicle 2 is less likely to return to its start point. Thus the map area setting unit 231 may further identify a road section leading to a trajectory along which the vehicle 2 has traveled, by referring to the trajectory and the map information for navigation, and set the second area so as to exclude the identified road section from the second area. As the trajectory along which the vehicle 2 has traveled, the map area setting unit 231 uses time-series positions of the vehicle 2 indicated by pieces of positioning information received from the GPS receiver 12 in the most recent certain period.

When setting the first area also, the map area setting unit 231 may exclude a road section unreachable by the vehicle 2 traveling a predetermined distance from the current position of the vehicle 2 from the first area. Further, the map area setting unit 231 may exclude a road section leading to a trajectory along which the vehicle 2 has traveled from the first area.

Upon setting an area of a high-precision map to be obtained from the map server 3, the map area setting unit 231 notifies the area to the request processing unit 232.

When notified by the map area setting unit 231 of an area of a high-precision map to be obtained, the request processing unit 232 generates a delivery request to the map server 3 including information indicating the area. The request processing unit 232 may include identifying information of the vehicle 2 in the delivery request. The request processing unit 232 outputs the generated delivery request to the wireless communication terminal 13 via the communication interface 21. In this way, the delivery request is transmitted to the map server 3.

The reception processing unit 233 writes a high-precision map received from the map server 3 via the wireless communication terminal 13 and the communication interface 21 in the memory area of the memory 22 for storing high-precision maps. Specifically, when the amount of data of a newly received high-precision map is larger than the size of free space of the memory area, the reception processing unit 233 overwrites one of the stored high-precision maps with the newly received high-precision map. To this end, the reception processing unit 233 determines the high-precision map to be overwritten in a predetermined order, as described in relation to the memory 22.

The reception processing unit 233 may determine the frequency of travel of the vehicle 2 for each road section, based on history of travel of the vehicle 2 in the most recent certain period. The reception processing unit 233 may identify a road section whose frequency of travel of the vehicle 2 is higher than a predetermined frequency threshold, and protect a high-precision map of an area including the identified road section so as not to be overwritten or deleted after delivery from the map server 3. In this case, the reception processing unit 233 may divide the memory 22 into a memory area for storing a high-precision map of the protected area and a memory area for storing high-precision maps of other areas. Regarding the memory area for storing a high-precision map of the protected area, the reception processing unit 233 may determine the areas to be overwritten in the order conforming to the LRU rule; and regarding the other memory areas, in the order received from the map server 3.

Upon receiving a request for acquisition of a high-precision map from the ECU 15 via the communication interface 21, the output processing unit 234 cuts out a predetermined area including the current position of the vehicle 2 from the area of a high-precision map stored in the memory 22 and outputs the cutout area to the ECU 15. The predetermined area is set smaller than the area of a high-precision map stored in the memory 22.

Figure 5:
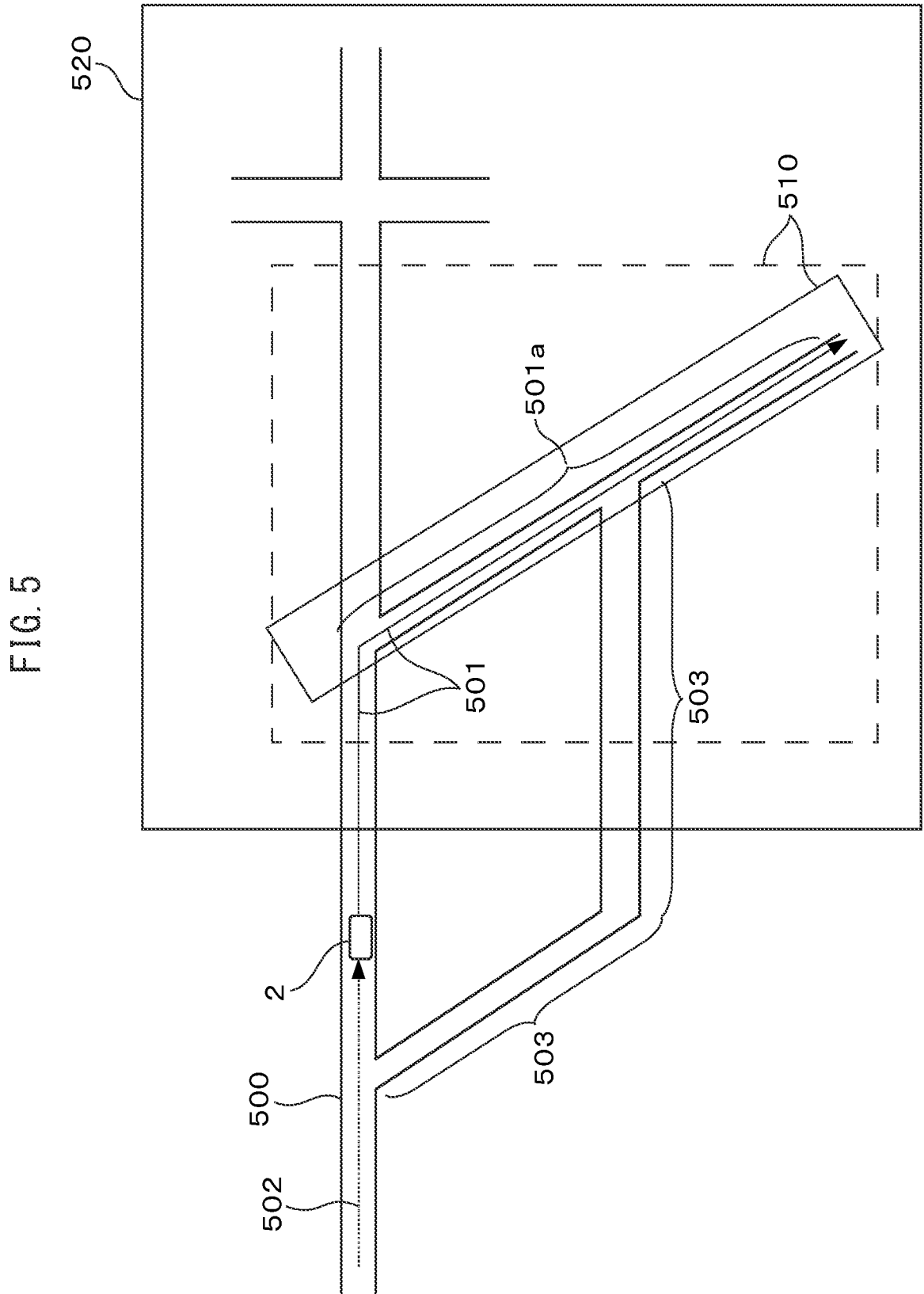
FIG. 5 is a schematic diagram for explaining the map information managing process.

FIG. 5 is a schematic diagram for explaining the map information managing process. In this example, assume that the vehicle 2 is traveling on a road 500 along a planned travel route 501 set by a navigation device (not illustrated).

When the level of autonomous driving control applied to the vehicle 2 does not require the driver to operate the vehicle 2, an area 510 of a high-precision map to be obtained from the map server 3 is set so as to include a predetermined section 501a ahead of the vehicle 2 on the planned travel route 501. In this example, the area 510 is set so as not to include roads other than the section 501a. However, the area 510 may be set as a predetermined-shaped (in this example, rectangular) area including the predetermined section 501a, as indicated by a broken line.

When the level of autonomous driving control applied to the vehicle 2 requires the driver to operate the vehicle 2, an area 520 of a high-precision map to be obtained from the map server 3 is set so as to include the predetermined section 501a and to be larger than the area 510. In particular, the area 520 is set so as to include other roads departing from the planned travel route because the route of the vehicle 2 is not necessarily identified. However, a road section 503 leading to a trajectory 502 along which the vehicle 2 has traveled may be excluded from the first area 510 and the second area 520.

FIG. 6 is an operation flowchart of the map information managing process. The processor 23 executes the map information managing process in accordance with the operation flowchart when the distance from the current position of the vehicle 2 to an outer edge of the area represented by a high-precision map stored in the memory 22 in the travel direction of the vehicle 2 falls below a predetermined distance.

The map area setting unit 231 of the processor 23 determines whether the level of autonomous driving control applied to the vehicle 2 requires the driver to operate the vehicle 2, by referring to control level information (step S101). When the level of autonomous driving control applied to the vehicle 2 does not require the driver to operate the vehicle 2 (No in step S101), the map area setting unit 231 sets a first area as the area of a high-precision map to be obtained from the map server 3 (step S102). When the level of autonomous driving control applied to the vehicle 2 requires the driver to operate the vehicle 2 (Yes in step S101), the map area setting unit 231 sets a second area as the area of a high-precision map to be obtained from the map server 3 (step S103).

After step S102 or S103, the request processing unit 232 of the processor 23 generates a delivery request to the map server 3 including information indicating the area of a high-precision map to be obtained (step S104). The request processing unit 232 outputs the delivery request to the wireless communication terminal 13 via the communication interface 21 to transmit the delivery request to the map server 3.

After transmission of the delivery request, the reception processing unit 233 of the processor 23 writes a high-precision map received from the map server 3 via the wireless communication terminal 13 and the communication interface 21 in the memory area of the memory 22 for storing high-precision maps, upon receiving the high-precision map (step S105). The processor 23 then terminates the map information managing process.

Figure 7:
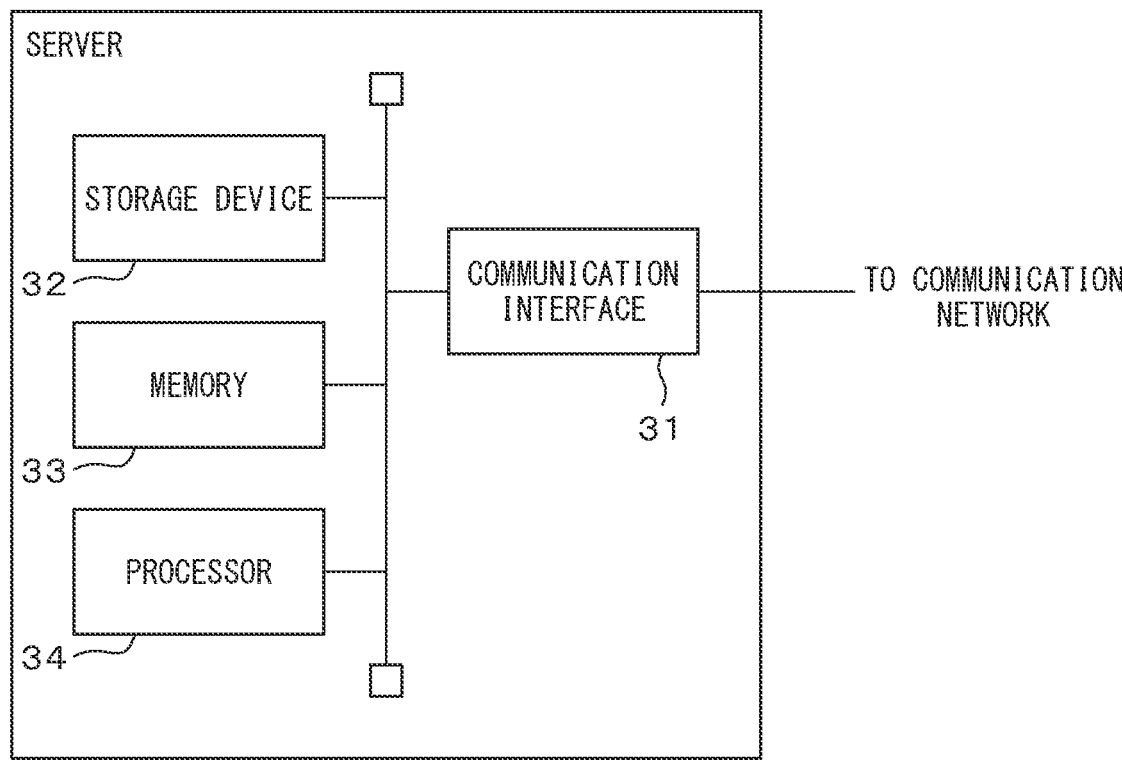
FIG. 7 illustrates the hardware configuration of the map server.

The following describes the map server 3. FIG. 7 illustrates the hardware configuration of the map server 3. The map server 3 includes a communication interface 31, a storage device 32, a memory 33, and a processor 34. The communication interface 31, the storage device 32, and the memory 33 are connected to the processor 34 via a signal line. The map server 3 may further include an input device, such as a keyboard and a mouse, and a display device, such as a liquid crystal display.

The communication interface 31, which is an example of the communication unit, includes an interface circuit for connecting the map server 3 to the communication network 4. The communication interface 31 is configured to be communicable with the vehicle 2 via the communication network 4 and the wireless base station 5. More specifically, the communication interface 31 passes a delivery request received from the vehicle 2 via the wireless base station 5 and the communication network 4 to the processor 34. Further, the communication interface 31 transmits a high-precision map received from the processor 34 to the vehicle 2 via the communication network 4 and the wireless base station 5.

The storage device 32, which is an example of a storage unit, includes, for example, a hard disk drive, or an optical medium and an access device therefor. The storage device 32 stores high-precision maps. A high-precision map stored in the storage device 32 covers an area larger than an area to be delivered to the vehicle 2. The storage device 32 may further store a computer program for a map delivery process executed by the processor 34.

The memory 33, which is another example of a storage unit, includes, for example, nonvolatile and volatile semiconductor memories. The memory 33 temporarily stores various types of data generated during execution of the map delivery process.

The processor 34 includes one or more central processing units (CPUs) and a peripheral circuit thereof. The processor 34 may further include another operating circuit, such as a logic-arithmetic unit or an arithmetic unit. The processor 34 executes the map delivery process.

Figure 8:
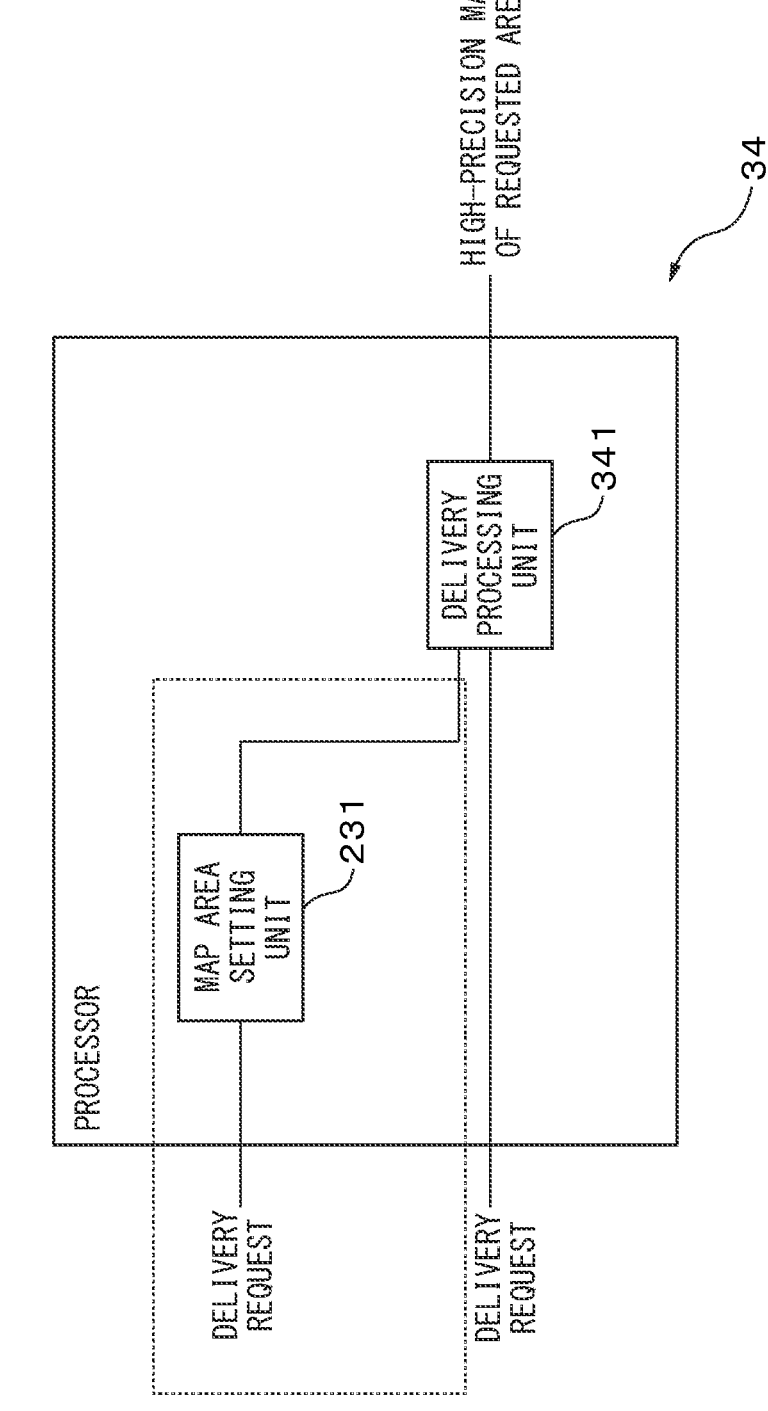
FIG. 8 is a functional block diagram of a processor of the server, related to a map delivery process.

FIG. 8 is a functional block diagram of the processor 34, related to the map delivery process. The processor 34 includes a delivery processing unit 341. The delivery processing unit 341 is a functional module, for example, implemented by a computer program executed by the processor 34, or may be a dedicated operating circuit provided in the processor 34.

The delivery processing unit 341 cuts out an area indicated by a delivery request received from the vehicle 2 via the communication network 4 and the communication interface 31 from a high-precision map stored in the storage device 32 to make a high-precision map for delivery. More specifically, when the area indicated by the delivery request is the first area, the delivery processing unit 341 cuts out the first area from a high-precision map stored in the storage device 32. When the area indicated by the delivery request is the second area, the delivery processing unit 341 cuts out the second area from a high-precision map stored in the storage device 32.

The delivery processing unit 341 transmits the high-precision map of the cutout area to the vehicle 2 via the communication interface 31 and the communication network 4.

Figure 9:
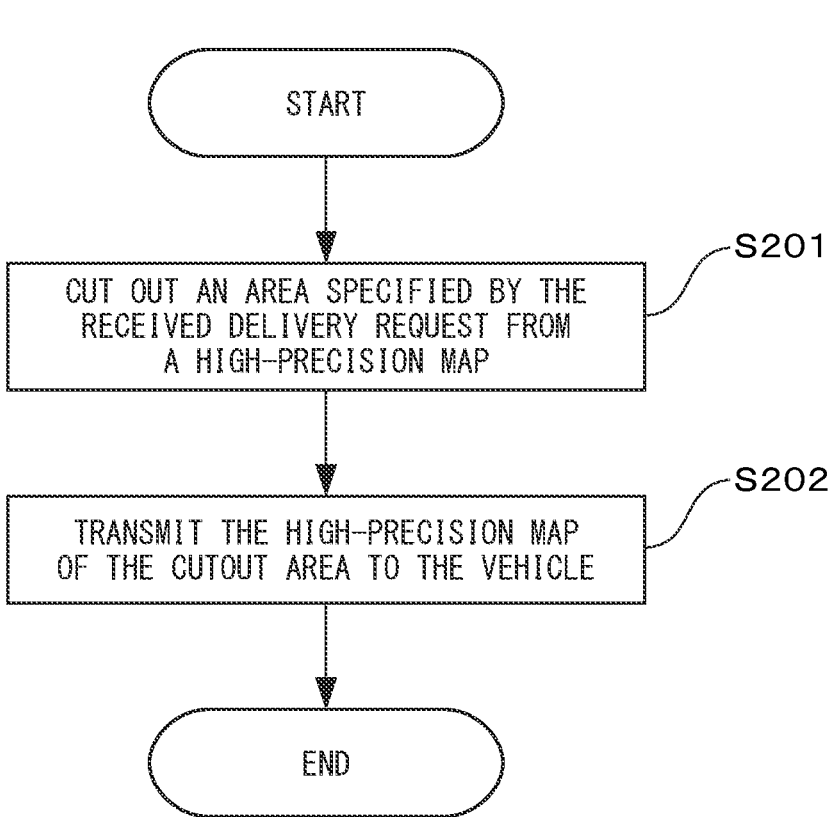
FIG. 9 is an operation flowchart of the map delivery process.

FIG. 9 is an operation flowchart of the map delivery process of the map server 3. The processor 34 of the map server 3 executes the map delivery process in accordance with the operation flowchart described below when a delivery request is received from the vehicle 2.

The delivery processing unit 341 of the processor 34 cuts out an area indicated by the received delivery request from a high-precision map stored in the storage device 32 (step S201). The delivery processing unit 341 transmits the high-precision map of the cutout area to the vehicle 2 via the communication interface 31 and the communication network 4 (step S202). The processor 34 then terminates the map delivery process.

As has been described above, the map information managing device is mounted on a vehicle, and sets an area represented in a high-precision map to be obtained from a map server, depending on the level of autonomous driving control applied to the vehicle and the position of the vehicle. This enables the map information managing device to appropriately set the area represented in map information received from a map server.

According to a modified example, even when the level of autonomous driving control applied to the vehicle 2 does not require the driver to operate the vehicle 2, the map area setting unit 231 may change the area of which delivery is requested, depending on the level or the road being traveled by the vehicle 2.

For example, when the level of autonomous driving control applied to the vehicle 2 corresponds to level 3 defined by SAE, driving control may be transferred to the driver. Further, when the road being traveled by the vehicle 2 is an ordinary road, there may be multiple roads that cross or diverge from the road being traveled by the vehicle 2. In such a case, the vehicle 2 may proceed along a route different from a planned travel route after transfer of driving control to the driver. Thus the map area setting unit 231 may set a second area in the case where the driver is not required to operate the vehicle 2 and control may be transferred to the driver at the level of autonomous driving control applied to the vehicle 2 and where the road being traveled by the vehicle 2 is an ordinary road.

When the road being traveled by the vehicle 2 is an expressway, there are no or few roads that cross or diverge from the expressway. For this reason, even if control is temporarily transferred to the driver, the vehicle 2 probably keeps traveling on the same road until control is thereafter transferred back to the ECU 15. Thus the map area setting unit 231 sets a first area in the case where the driver is not required to operate the vehicle 2 and control may be transferred to the driver at the level of autonomous driving control applied to the vehicle 2 but where the road being traveled by the vehicle 2 is an expressway. In this case, when control is not transferred back to the ECU 15 even after a predetermined period from transfer of control to the driver, the map area setting unit 231 may set a second area and the request processing unit 232 may request the map server 3 to deliver a high-precision map of the second area. In the case where the driver is not required to operate the vehicle 2 and control will not be transferred to the driver at the level of autonomous driving control applied to the vehicle 2, the map area setting unit 231 sets a first area, as in the embodiment. The level at which the driver is not required to operate the vehicle 2 and at which control will not be transferred to the driver may be, for example, an autonomous driving level corresponding to level 4 or 5 defined by SAE.

According to this modified example, the map information managing device 14 can set the area of a high-precision map of which delivery is requested of the map server 3 more appropriately.

According to another modified example, processing of the map area setting unit 231 executed by the processor 23 of the map information managing device 14 of the vehicle 2 may be executed by the processor 34 of the map server 3. In this case, the request processing unit 232 of the map information managing device 14 includes the current position of the vehicle 2 and control level information, in a delivery request. The request processing unit 232 may further include various types of information used for setting the area of a map of which delivery is requested, such as a planned travel route of the vehicle 2, in the delivery request. The map area setting unit 231 included in the processor 34 of the map server 3 sets an area of a high-precision map to be delivered, as in the embodiment or modified example described above, by referring to the information included in a delivery request, and notifies the delivery processing unit of the set area. In this modified example also, the map information managing device can have the same advantageous effect as that in the embodiment.

When processing of the map area setting unit 231 is executed by the map server 3, the map area setting unit 231 may set a second area as an area of a high-precision map to be delivered, by referring to trajectories of a large number of vehicles. In this case, the map delivery system 1 includes multiple vehicles 2. Each of the vehicles 2 includes information indicating the trajectory of the vehicle in a delivery request. Every time information indicating a trajectory is received from one of the vehicles 2, the map server 3 stores the received information in the storage device 32. In this modified example, the region represented in a high-precision map stored in the storage device 32 is divided into multiple divisions. The map area setting unit 231 counts the number of trajectories in a division and the number of trajectories leading from the division to an adjoining division for each adjoining division; these numbers are counted for each division. In addition, the map area setting unit 231 calculates the ratio of the number of trajectories leading from a division to an adjoining division to the number of trajectories in the division for each adjoining division as a proceeding probability; the proceeding probabilities are calculated for each division. The map area setting unit 231 then sets the second area so as to include a division whose proceeding probability is not less than a predetermined threshold among divisions adjoining a division including the current position of a vehicle 2 that has transmitted a delivery request. According to this modified example, the map server 3 can include a region where a vehicle 2 requesting delivery of a high-precision map will probably travel in the area of the high-precision map to be delivered, even when the level of autonomous driving control applied to the vehicle 2 requires the driver to operate the vehicle.

The computer program for causing a computer to achieve the functions of the units included in the processor of the map information managing device according to the embodiment or modified examples may be provided in a form recorded on a computer-readable storage medium. The computer-readable storage medium may be, for example, a magnetic medium, an optical medium, or a semiconductor memory.

As described above, those skilled in the art may make various modifications according to embodiments within the scope of the present invention.

13

14

What is claimed is:

1. A map information managing device to be mounted on a vehicle, comprising a processor configured to:

set an area represented in map information including information used for autonomous driving control based on a level of autonomous driving control applied to the vehicle and a position of the vehicle, the area being an area of a surroundings of the vehicle, wherein the position of the vehicle is determined by a satellite positioning device mounted on the vehicle, and the determined position of the vehicle is transmitted to the map information managing device via an in-vehicle network of the vehicle, request a map server to deliver the map information of the set area, via a wireless communication terminal mounted on the vehicle, and receive the map information from the wireless communication terminal, wherein the map information is included in a downlink radio signal which the wireless communication terminal receives from a wireless base station connected to the map server via a communication network, wherein the processor is further configured to set the area to be a first area when the level of autonomous driving control applied to the vehicle does not require a driver to operate the vehicle, and set the area to be a second area larger than the first area when the level of autonomous driving control applied to the vehicle requires a driver to operate the vehicle, and wherein a size of the set area corresponds to an amount of data transmitted between the map information managing device, via the wireless communication terminal, and the map server.

2. The map information managing device according to claim 1, wherein the processor sets a predetermined section ahead of the vehicle in a road being traveled by the vehicle or in a planned travel route leading to a destination of the vehicle as the first area, and sets a predetermined-shaped region including the first area as the second area.

3. The map information managing device according to claim 1, wherein the processor sets the second area so as to include one or more locations reachable by traveling a predetermined distance from the current position of the vehicle.

4. The map information managing device according to claim 1, wherein the processor sets the second area so as to exclude a road leading to a trajectory along which the vehicle has traveled from the second area.

5. The map information managing device according to claim 1, wherein the processor sets the first area in the case where a driver is not required to operate the vehicle and control of the vehicle may be transferred to the driver at the level of autonomous driving control applied to the vehicle and where a road being traveled by the vehicle is an expressway, and sets the second area larger than the first area in the case where a driver is not required to operate the vehicle and control of the vehicle may be transferred to the driver at the level of autonomous driving control applied to the vehicle and where a road being traveled by the vehicle is an ordinary road.

6. The map information managing device according to claim 1, wherein further comprising a memory storing existing map information in a memory area, wherein, when the memory area is full and a new map information is received, the processor deletes or overwrites at least a portion of the existing map information in a predetermined order, and wherein the predetermined order is based on a frequency of travel corresponding to each road section within the existing map information.

7. A method for managing map information executed in a map information managing device mounted on a vehicle, comprising:

setting an area represented in map information including information used for autonomous driving control based on a level of autonomous driving control applied to the vehicle and a position of the vehicle, the area being an area of the surroundings of the vehicle, wherein the position of the vehicle is determined by a satellite positioning device mounted on the vehicle, and the determined position of the vehicle is transmitted to the map information managing device via an in-vehicle network of the vehicle;

requesting a map server to deliver the map information of the set area, via a wireless communication terminal mounted on the vehicle; and receiving the map information from the wireless communication terminal, wherein the map information is included in a downlink radio signal which the wireless communication terminal receives from a wireless base station connected to the map server via a communication network, wherein the setting the area comprises setting the area to be a first area when the level of autonomous driving control applied to the vehicle does not require a driver to operate the vehicle, and setting the area to be a second area larger than the first area when the level of autonomous driving control applied to the vehicle requires a driver to operate the vehicle, and wherein a size of the set area corresponds to an amount of data transmitted between the map information managing device, via the wireless communication terminal, and the map server.

8. A non-transitory recording medium that stores a computer program for managing map information, the computer program causing a processor of a map information managing device mounted on a vehicle to execute a process comprising:

setting an area represented in map information including information used for autonomous driving control based on a level of autonomous driving control applied to the vehicle and a position of the vehicle, the area being an area of the surroundings of the vehicle, wherein the position of the vehicle is determined by a satellite positioning device mounted on the vehicle, and the determined position of the vehicle is transmitted to the map information managing device via an in-vehicle network of the vehicle;

requesting a map server to deliver the map information of the set area, via a wireless communication terminal mounted on the vehicle; and receiving the map information from the wireless communication terminal, wherein the map information is included in a downlink radio signal which the wireless communication terminal receives from a wireless base station connected to the map server via a communication network, wherein the setting the area comprises setting the area to be a first area when the level of autonomous driving control applied to the vehicle does not require a driver to operate the vehicle, and setting the area to be a second area larger than the first area when the level of autonomous driving control applied to the vehicle requires a driver to operate the vehicle, and wherein a size of the set area corresponds to an amount of data transmitted between the map information managing device, via the wireless communication terminal, and the map server.

9. A map server that delivers map information including information used for autonomous driving control, the map server comprising a processor configured to:

set an area represented in map information to be delivered to a vehicle based on a level of autonomous driving control applied to the vehicle and a position of the vehicle that are received from the vehicle via a communication interface, the area being an area of the surroundings of the vehicle, and deliver the map information of the set area to the vehicle via the communication interface, wherein the processor is further configured to set the area to be a first area when the level of autonomous driving control applied to the vehicle does not require a driver to operate the vehicle, and set the area to be a second area larger than the first area when the level of autonomous driving control applied to the vehicle requires a driver to operate the vehicle, and wherein a size of the set area corresponds to an amount of data delivered to the vehicle, via the wireless communication terminal.

* * * * *